US012666136B1

(12) United States Patent
Yui et al.

(10) Patent No.: US 12,666,136 B1
(45) Date of Patent: Jun. 23, 2026

(54) IMAGE CAPTURE DEVICE WITH DYNAMIC SETTINGS

(71) Applicant: GoPro, Inc., San Mateo, CA (US)

(72) Inventors: Stephen Yui, Oakland, CA (US); Grant Adam McCauley, San Mateo, CA (US); Nicholas Woodman, Big Sky, MT (US)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 18/824,791

(22) Filed: Sep. 4, 2024

Related U.S. Application Data

(60) Provisional application No. 63/614,766, filed on Dec. 26, 2023, provisional application No. 63/580,541, filed on Sep. 5, 2023.

(51) Int. Cl.
H04N 23/63 (2023.01)
H04N 23/62 (2023.01)

(52) U.S. Cl.
CPC ........... H04N 23/632 (2023.01); H04N 23/62 (2023.01)

(58) Field of Classification Search
CPC .............................. H04N 23/632; H04N 23/62
See application file for complete search history.

(56) References Cited

U.S. PATENT DOCUMENTS

| | | | |
|---|---|---|---|
| 2013/0083219 A1* | 4/2013 | Heo ........................ | H04N 5/262 348/333.02 |
| 2016/0139738 A1* | 5/2016 | Wever ................. | G06F 3/04847 715/810 |
| 2016/0191800 A1* | 6/2016 | Yoshikawa .......... | H04N 23/632 348/220.1 |
| 2019/0281212 A1* | 9/2019 | Nishiyama ............. | G03B 17/18 |
| 2020/0137296 A1* | 4/2020 | Okada .................. | H04N 23/667 |
| 2023/0156326 A1* | 5/2023 | Funatsu ............... | H04N 23/632 348/220.1 |

* cited by examiner

*Primary Examiner* — Jason A Flohre
(74) *Attorney, Agent, or Firm* — Esplin & Associates, PC

(57) ABSTRACT

An image capture device may include an electronic display. A graphical user interface may be presented on the electronic display. The graphical user interface may provide a dynamic view of the settings of the image capture device. Settings shown within the graphical user interface may dynamically change to show the available settings of the image capture device.

12 Claims, 11 Drawing Sheets

System 10

System 10

Figure 2:
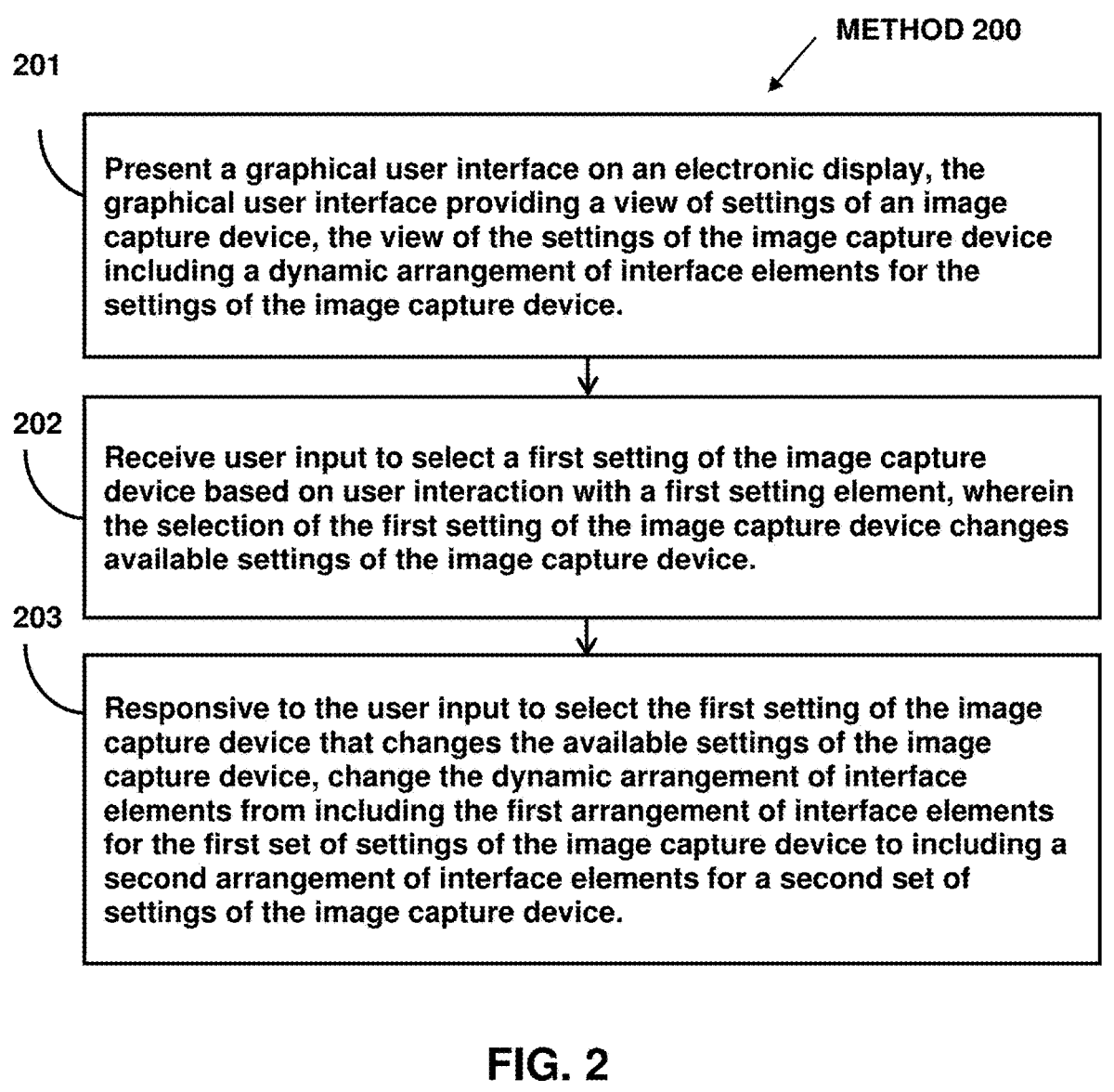

METHOD 200

201

201
Present a graphical user interface on an electronic display, the graphical user interface providing a view of settings of an image capture device, the view of the settings of the image capture device including a dynamic arrangement of interface elements for the settings of the image capture device.

202
Receive user input to select a first setting of the image capture device based on user interaction with a first setting element, wherein the selection of the first setting of the image capture device changes available settings of the image capture device.

203
Responsive to the user input to select the first setting of the image capture device that changes the available settings of the image capture device, change the dynamic arrangement of interface elements from including the first arrangement of interface elements for the first set of settings of the image capture device to including a second arrangement of interface elements for a second set of settings of the image capture device.

FIG. 2 image capture device 300 image sensor 306 electronic display 308 field of view 305 processor 310 housing 302 optical element 304

400

500

500

500

IMAGE CAPTURE DEVICE WITH DYNAMIC SETTINGS

FIELD

This disclosure relates to presentation of a dynamic view of the settings of the image capture device.

BACKGROUND

A user may operate an image capture device to change the settings of the image capture device. A change in the settings of the image capture device may change what settings are available for the image capture device.

SUMMARY

This disclosure relates to presenting dynamic settings of an image capture device. The image capture device may include a housing. The housing may carry one or more of an optical element, an image sensor, an electronic display, and/or other components. The optical element may guide light within a field of view to the image sensor. The image sensor may generate a visual output signal conveying visual information based on light that becomes incident thereon. The visual information may define visual content. The electronic display may visually present information.

A graphical user interface may be presented on the electronic display. The graphical user interface may provide a view of settings of the image capture device. The view of the settings of the image capture device may include a dynamic arrangement of interface elements for the settings of the image capture device. The dynamic arrangement of interface elements may dynamically change to show available settings of the image capture device. The dynamic arrangement of interface elements may include a first arrangement of interface elements for a first set of settings of the image capture device. The first arrangement of interface elements may include a first setting element for a first setting of the image capture device.

User input to select the first setting of the image capture device may be received based on user interaction with the first setting element and/or other information. The selection of the first setting of the image capture device may change the available settings of the image capture device. Responsive to the user input to select the first setting of the image capture device that changes the available settings of the image capture device, the dynamic arrangement of interface elements may be changed from including the first arrangement of interface elements for the first set of settings of the image capture device to including a second arrangement of interface elements for a second set of settings of the image capture device. The second arrangement of interface elements may be different from the first arrangement of interface elements.

A housing may carry one or more components of an image capture device. The housing may carry (be attached to, support, hold, and/or otherwise carry) one or more of an electronic storage, an optical element, an image sensor, an electronic display, a processor, and/or other components.

The electronic storage may store information relating to the image capture device, information relating to components of the image capture device, visual information, information relating to visual content captured by the image capture device, information relating to graphical user interface, information relating to interface elements, information relating to user interaction with the image capture device, and/or other information.

The optical element may be configured to guide light within a field of view to the image sensor. The field of view may be less than 180 degrees. The field of view may be equal to 180 degrees. The field of view may be greater than 180 degrees.

The image sensor may be configured to generate a visual output signal and/or other output signals based on light that becomes incident thereon and/or other information. The visual output signal may convey visual information and/or other information. The visual information may define visual content having the field of view.

The electronic display may be configured to visually present information. The electronic display may include one or more touchscreen displays.

The processor(s) may be configured by machine-readable instructions. Executing the machine-readable instructions may cause the processor(s) to facilitate presenting dynamic settings of an image capture device. The machine-readable instructions may include one or more computer program components. The computer program components may include one or more of a graphical user interface component, a user input component, a change component, and/or other computer program components.

The graphical user interface component may be configured to present one or more graphical user interfaces on the electronic display. The graphical user interface(s) may provide a view of settings of the image capture device. The view of the settings of the image capture device may include a dynamic arrangement of interface elements for the settings of the image capture device. The dynamic arrangement of interface elements may dynamically change to show available settings of the image capture device. The dynamic arrangement of interface elements may include a first arrangement of interface elements for a first set of settings of the image capture device and/or other arrangements of interface elements for other sets of settings of the image capture device. The first arrangement of interface elements may include a first setting element for a first setting of the image capture device and/or other setting elements for other settings of the image capture device.

The user input component may be configured to receive user input to select one or more of the settings of the image capture device. The user input to select one or more of the settings of the image capture device may be received based on user interaction with one or more interface elements. The user input component may be configured to receive user input to select the first setting of the image capture device. The user input to select the first setting of the image capture device may be received based on user interaction with the first setting element. The selection of the first setting of the image capture device may change the available settings of the image capture device.

The change component may be configured to change the dynamic arrangement of interface elements. The dynamic arrangement of interface elements may be changed based user input that changes the available settings of the image capture device. The dynamic arrangement of interface elements may be changed based on a change in the available settings of the image capture device. The change component may be configured to, responsive to the user input to select the first setting of the image capture device that changes the available settings of the image capture device, change the dynamic arrangement of interface elements from including the first arrangement of interface elements for the first set of settings of the image capture device to including a second arrangement of interface elements for a second set of settings of the image capture device. The second arrangement of interface elements may be different from the first arrangement of interface elements.

In some implementations, the first arrangement of interface elements may include a second setting element for a second setting of the image capture device. The change in the available settings for the image capture device may include the second setting of the image capture device becoming unavailable. The second arrangement of interface element may not include the second setting element responsive to the second setting of the image capture device becoming unavailable. The second arrangement of interface element may change one or more visual characteristics of the second setting element responsive to the second setting of the image capture device becoming unavailable. The changed visual characteristic(s) of the second setting element may indicate that the second setting of the image capture device is unavailable.

In some implementations, the change in the available settings for the image capture device may include the second setting of the image capture device becoming available. The first arrangement of interface elements may not include the second setting element for the second setting of the image capture device, and the second arrangement of interface element may include the second setting element responsive to the second setting of the image capture device becoming available. The first arrangement of interface elements may include the second setting element for the second setting of the image capture device, with one or more visual characteristics of the second setting element indicating that the second setting of the image capture device is unavailable, and the second arrangement of interface elements may include a change in one or more visual characteristics of the second setting element responsive to the second setting of the image capture device becoming available. The changed visual characteristic(s) of the second setting element may indicate that the second setting of the image capture device is available.

In some implementations, a given setting of the image capture device that causes interface elements for other settings of the image capture device to appear or disappear from the dynamic arrangement of interface elements may include visual profile setting, aspect ratio setting, and/or other settings.

In some implementations, a given setting of the image capture device that causes interface elements for other settings of the image capture device to change in one or more visual characteristics includes resolution setting, frame rate setting, lens setting, stabilization setting, and/or other settings.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

BRIEF DESCRIPTION OF THE DRAWINGS

FIG. 2 illustrates an example method for presenting dynamic settings of an image capture device.

DETAILED DESCRIPTION

Figure 1:
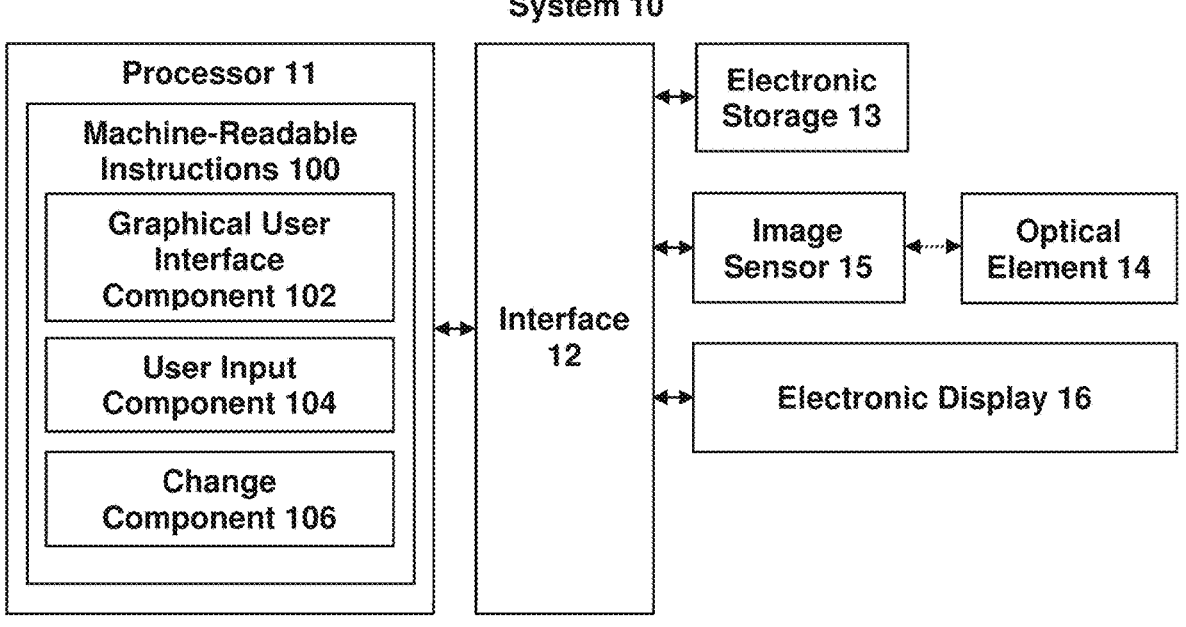
FIG. 1 illustrates an example system for presenting dynamic settings of an image capture device.

FIG. 1 illustrates a system 10 for presenting dynamic settings of an image capture device. The system 10 may include one or more of a processor 11, an interface 12 (e.g., bus, wireless interface), an electronic storage 13, an optical element 14, an image sensor 15, an electronic display 16, and/or other components. The system 10 may include and/or be part of an image capture device. The image capture device may include a housing, and one or more of the electronic storage 13, optical element 14, the image sensor 15, the electronic display 16, and/or other components of the system 10 may be carried by the housing of the image capture device. The optical element 14 may guide light within a field of view to the image sensor 15. The image sensor 15 may generate a visual output signal conveying visual information based on light that becomes incident thereon. The visual information may define visual content. The electronic display 16 may visually present information.

A graphical user interface may be presented on the electronic display 16. The graphical user interface may provide a view of settings of the image capture device. The view of the settings of the image capture device may include a dynamic arrangement of interface elements for the settings of the image capture device. The dynamic arrangement of interface elements may dynamically change to show available settings of the image capture device. The dynamic arrangement of interface elements may include a first arrangement of interface elements for a first set of settings of the image capture device. The first arrangement of interface elements may include a first setting element for a first setting of the image capture device.

User input to select the first setting of the image capture device may be received by the processor 11 based on user interaction with the first setting element and/or other information. The selection of the first setting of the image capture device may change the available settings of the image capture device. Responsive to the user input to select the first setting of the image capture device that changes the available settings of the image capture device, the dynamic arrangement of interface elements may be changed by the processor 11 from including the first arrangement of interface elements for the first set of settings of the image capture device to including a second arrangement of interface elements for a second set of settings of the image capture device. The second arrangement of interface elements may be different from the first arrangement of interface elements.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store information relating to the image capture device, information relating to components of the image capture device, visual information, information relating to visual content captured by the image capture device, information relating to graphical user interface, information relating to interface elements, information relating to user interaction with the image capture device, and/or other information. The electronic storage 13 may include non-transitory, machine-readable storage media. The non-transitory machine-readable storage media may include permanent memory and/or temporary memory. The electronic storage 13/the non-transitory, machine-readable storage media may store information defining content that has been captured by the image capture device.

Visual content may refer to content of image(s), video frame(s), and/or video(s) that may be consumed visually. For example, visual content may be included within one or more images and/or one or more video frames of a video. The video frame(s) may define/contain the visual content of the video. That is, video may include video frame(s) that define/contain the visual content of the video. Video frame(s) may define/contain visual content viewable as a function of progress through the progress length of the video content. A video frame may include an image of the video content at a moment within the progress length of the video. As used herein, the term video frame may be used to refer to one or more of an image frame, frame of pixels, encoded frame (e.g., I-frame, P-frame, B-frame), and/or other types of video frame. Visual content may be generated based on light received within a field of view of a single image sensor or within fields of view of multiple image sensors.

Visual content (of image(s), of video frame(s), of video (s)) with a field of view may be captured by an image capture device during a capture duration. A field of view of visual content may define a field of view of a scene captured within the visual content. A capture duration may be measured/defined in terms of time durations and/or frame numbers. For example, visual content may be captured during a capture duration of 60 seconds, and/or from one point in time to another point in time. As another example, 1800 images may be captured during a capture duration. If the images are captured at 30 images/second, then the capture duration may correspond to 60 seconds. Other capture durations are contemplated.

Visual content may be stored in one or more formats and/or one or more containers. A format may refer to one or more ways in which the information defining visual content is arranged/laid out (e.g., file format). A container may refer to one or more ways in which information defining visual content is arranged/laid out in association with other information (e.g., wrapper format). Information defining visual content (visual information) may be stored within a single file or multiple files. For example, visual information defining an image or video frames of a video may be stored within a single file (e.g., image file, video file), multiple files (e.g., multiple image files, multiple video files), a combination of different files, and/or other files.

The system 10 may be remote from the image capture device or local to the image capture device. One or more portions of the image capture device may be remote from or a part of the system 10. One or more portions of the system 10 may be remote from or a part of the image capture device. For example, one or more components of the system 10 may be carried by a housing, such as a housing of an image capture device. For instance, the electronic storage 13, the optical element 14, the image sensor 15, and/or the electronic display 16 of the system 10 may be carried by the housing of the image capture device. The electronic display 16 may be an electronic display of the image capture device or an electronic display of another computing device (e.g., mobile device paired with the image capture device). The housing of the image capture device may carry other components of the system 10, such as the processor 11. References to a housing of an image capture device may refer to the image capture device, and vice versa.

An image capture device may refer to a device that captures visual content. An image capture device may capture visual content in the form of images, videos, and/or other forms. An image capture device may refer to a device for recording visual information in the form of images, videos, and/or other media. An image capture device may capture other content, such as audio content using one or more sound sensors. An image capture device may capture metadata (e.g., position data, movement data) relating to the visual content and/or audio content. An image capture device may be a standalone device (e.g., camera, action camera, image sensor) or may be part of another device (e.g., part of a smartphone, tablet).

Figure 3:
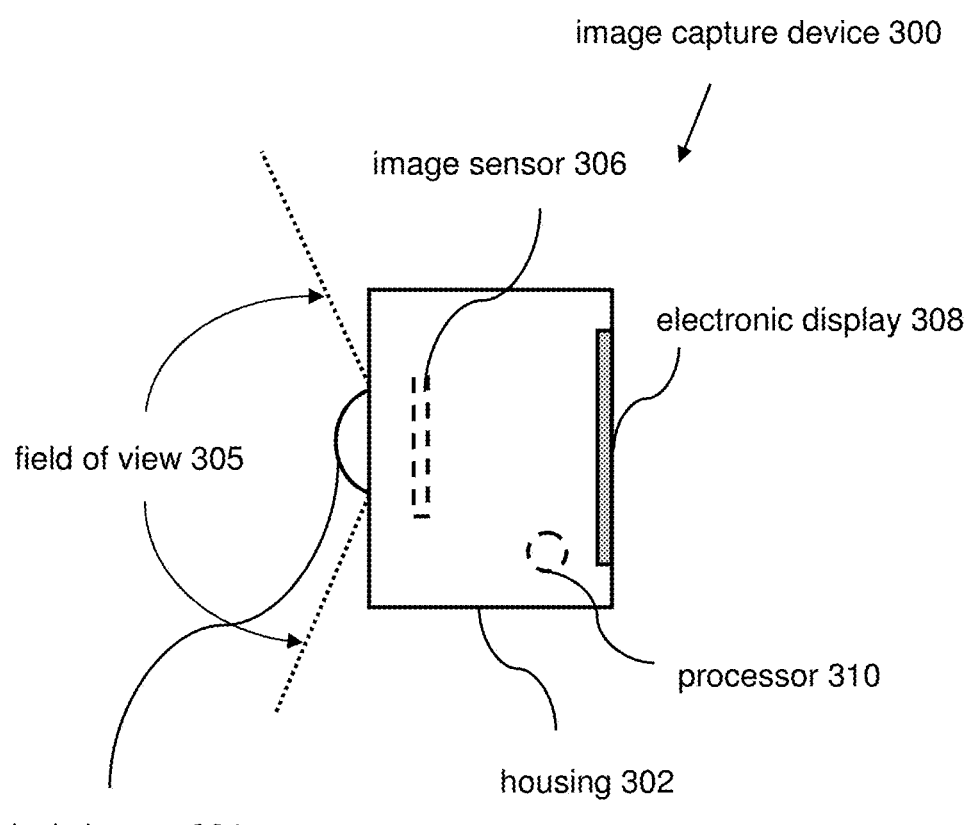
FIG. 3 illustrates an example image capture device.

FIG. 3 illustrates an example image capture device 300. Visual content (e.g., of image(s), video frame(s)), audio content, metadata relating to the visual content and/or audio content, and/or other content may be captured by the image capture device 300. The image capture device 300 may include a housing 302. The housing 302 may refer a device (e.g., casing, shell) that covers, protects, and/or supports one or more components of the image capture device 300. The housing 302 may include a single-piece housing or a multi-piece housing. The housing 302 may carry one or more components of the image capture device 300. The housing 302 may carry (be attached to, support, hold, and/or otherwise carry) one or more of an optical element 304, an image sensor 306, an electronic display 308, a processor 310, and/or other components.

One or more components of the image capture device 300 may be the same as, be similar to, and/or correspond to one or more components of the system 10. For example, the processor 310 may be the same as, be similar to, and/or correspond to the processor 11. The optical element 304 may be the same as, be similar to, and/or correspond to the optical element 14. The image sensor 306 may be the same as, be similar to, and/or correspond to the image sensor 15. The electronic display 308 may be the same as, be similar to, and/or correspond to the electronic display 16.

The image capture device 300 may include other components not shown in FIG. 3. The image capture device 300 may not include one or more components shown in FIG. 3. For example, the image capture device 300 may include one or more sound sensors. Other configurations of image capture devices are contemplated.

The optical element 304 may include instrument(s), tool (s), and/or medium that acts upon light passing through the instrument(s)/tool(s)/medium. For example, the optical element 304 may include one or more of lens, mirror, prism, and/or other optical elements. The optical element 304 may affect direction, deviation, and/or path of the light passing through the optical element 304. The optical element 304 may have a field of view 305. The optical element 304 may be configured to guide light within the field of view 305 to the image sensor 306.

The field of view 305 may include the field of view of a scene that is within the field of view of the optical element 304 and/or the field of view of the scene that is delivered to the image sensor 306. For example, the optical element 304 may guide light within its field of view to the image sensor 306 or may guide light within a portion of its field of view to the image sensor 306. The field of view of 305 of the optical element 304 may refer to the extent of the observable world that is seen through the optical element 304. The field of view 305 of the optical element 304 may include one or more angles (e.g., vertical angle, horizontal angle, diagonal angle) at which light is received and passed on by the optical element 304 to the image sensor 306. In some implementations, the field of view 305 may be greater than 180-degrees. In some implementations, the field of view 305 may be less than 180-degrees. In some implementations, the field of view 305 may be equal to 180-degrees.

In some implementations, the image capture device 300 may include multiple optical elements. For example, the image capture device 300 may include multiple optical elements that are arranged on the housing 302 to capture spherical images/videos (guide light within spherical field of view to one or more images sensors). For instance, the image capture device 300 may include two optical elements positioned on opposing sides of the housing 302. The fields of views of the optical elements may overlap and enable capture of spherical images and/or spherical videos.

The image sensor 306 may include sensor(s) that converts received light into output signals. The output signals may include electrical signals. The image sensor 306 may generate output signals conveying information that defines visual content of one or more images and/or one or more video frames of a video. For example, the image sensor 306 may include one or more of a charge-coupled device sensor, an active pixel sensor, a complementary metal-oxide semiconductor sensor, an N-type metal-oxide-semiconductor sensor, and/or other image sensors.

The image sensor 306 may be configured to generate output signals conveying information that defines visual content of one or more images and/or one or more video frames of a video. The image sensor 306 may be configured to generate a visual output signal based on light that becomes incident thereon during a capture duration and/or other information. The visual output signal may convey visual information that defines visual content having the field of view. The optical element 304 may be configured to guide light within the field of view 305 to the image sensor 306, and the image sensor 306 may be configured to generate visual output signals conveying visual information based on light that becomes incident thereon via the optical element 304.

The visual information may define visual content by including information that defines one or more content, qualities, attributes, features, and/or other aspects of the visual content. For example, the visual information may define visual content of an image by including information that makes up the content of the image, and/or information that is used to determine the content of the image. For instance, the visual information may include information that makes up and/or is used to determine the arrangement of pixels, characteristics of pixels, values of pixels, and/or other aspects of pixels that define visual content of the image. For example, the visual information may include information that makes up and/or is used to determine pixels of the image. Other types of visual information are contemplated.

Capture of visual content by the image sensor 306 may include conversion of light received by the image sensor 306 into output signals/visual information defining visual content. Capturing visual content may include recording, storing, and/or otherwise capturing the visual content for use in generating video content (e.g., content of video frames). For example, during a capture duration, the visual output signal generated by the image sensor 306 and/or the visual information conveyed by the visual output signal may be used to record, store, and/or otherwise capture the visual content for use in generating video content.

In some implementations, the image capture device 300 may include multiple image sensors. For example, the image capture device 300 may include multiple image sensors carried by the housing 302 to capture spherical images/videos based on light guided thereto by multiple optical elements. For instance, the image capture device 300 may include two image sensors configured to receive light from two optical elements positioned on opposing sides of the housing 302. The fields of views of the optical elements may overlap and enable capture of spherical images and/or spherical videos.

The image capture device 300 may include other sensors. For example, the image capture device 300 may include one or more sound sensors to capture audio content. A sound sensor may include sensor(s) (e.g., microphone, component (s) of microphone) that converts received sounds into output signals. The output signals may include electrical signals. The sound sensor may generate output signals conveying information based on sounds received by the sound sensor. For example, the sound sensor may be configured to generate an audio output signal conveying audio information based on the sounds received by the sound sensor. The audio information may define audio content. The audio information may define audio content by including information that defines one or more content, qualities, attributes, features, and/or other aspects of the audio content. For example, the audio information may define audio content by including information that makes up the content of the audio, and/or information that is used to determine the content of the audio. The audio content may include one or more reproductions of the received sounds. The audio information may define audio content in one or more formats, such as WAV, MP3, MP4, RAW, and/or other formats.

The image capture device 300 may include one or more location sensors (e.g., GPS sensors) to measure location of the image capture device and/or one or more position sensors (e.g., gyroscope, accelerometer, inertial measurement unit) to measure position, movement, and/or orientation of the image capture device. In some implementations, information about location, position, and/or movement of the image capture device may be stored as metadata of other content (e.g., visual content, audio content) captured by the image capture device.

The electronic display 308 may include an electronic device that provides visual presentation of information. The electronic display 308 may include a color display and/or a non-color display. The electronic display 308 may be configured to visually present information. The image capture device 300 may include multiple electronic displays.

The electronic display 308 may include one or more touchscreen displays. A touchscreen display may include one or more touch-sensitive screens and/or other components. A user may engage with the electronic display 308 by touching one or more portions of a touch-sensitive screen (e.g., with one or more fingers, stylus). A user may engage with the electronic display 308 at a moment in time, at multiple moments in time, during a period, and/or during multiple periods. For example, a user may tap on, hold, or move along the electronic display 308 to provide input to the image capture device. For example, a user may tap on and/or hold a finger on a portion of the electronic display 308 corresponding to a virtual button to provide input to the image capture device.

The electronic display 308 may be configured to receive user input via a user's engagement with the electronic display 308. A user may engage with the electronic display 308 via interaction with one or more touch-sensitive surfaces/screens and/or other components of the electronic display 308. The electronic display 308 may be configured to receive user input to change the operation of the image capture device (e.g., change setting, start recording, stop recording). For example, the electronic display 308 may present one or more options for a user to provide input to the image capture device 300, such as by presenting one or more virtual (soft) buttons. The user may change the operation of the image capture device 300 by engaging one or more fingers on the location of the electronic display 308 corresponding to the virtual button(s). The electronic display 308 may be configured to generate output signals indicating location of the user's engagement with the electronic display 308. User input (to change operation of the image capture device) may be received/determined based on the output signals generated by the electronic display 308.

The electronic display 308 may be configured to present visual content, graphical user interface, and/or other information. A graphical user interface may include a graphical form that enables a user to interact with the image capture device 300 and/or see information provided by the image capture device 300. A graphical user interface may include one or more interface elements. The interface element(s) may enable presentation of information to the user and/or reception of user input to control the image capture device 300.

A processor may include one or more processors (logic circuitry) that provide information processing capabilities in the image capture device. The processor may provide one or more computing functions for the image capture device. The processor may operate/send command signals to one or more components of the image capture device to operate the image capture device. For example, referring to FIG. 3, the processor 310 may facilitate operation of the image capture device 300 in capturing image(s) and/or video(s), facilitate operation of the optical element 304 (e.g., change how light is guided by the optical element 304), and/or facilitate operation of the image sensor 306 (e.g., change how the received light is converted into information that defines images/videos and/or how the images/videos are post-processed after capture).

The processor 310 may obtain information from the image sensor 306 and/or facilitate transfer of information from the image sensor 306 to another device/component. The processor 310 may obtain information from other sensor(s) and/or facilitate transfer of information from other sensor(s) to another device/component. The processor 310 may be remote from the processor 11 or local to the processor 11. One or more portions of the processor 310 may be remote from the processor 11 and/or one or more portions of the processor 10 may be part of the processor 310. The processor 310 may include and/or perform one or more functionalities of the processor 11 shown in FIG. 1.

A user may interact with the image capture device 300 to configure the image capture device 300 for content capture. For example, the user may directly interact with the image capture device 300 by pressing physical button(s) of the image capture device 300 and/or virtual button(s) presented on the electronic display 308 to select (ascertain, determine, establish, set) the settings that will be used by the image capture device 300 to capture visual content, audio content, and/or other content. A user may indirectly interact with the image capture device 300 by pressing physical button(s) of a mobile device (a mobile device paired with the image capture device 300) and/or virtual button(s) presented on an electronic display of the mobile device to select the settings that will be used by the image capture device 300 to capture visual content, audio content, and/or other content. User selection of one or more of the image capture device settings may change what settings are available (able to be used, compatible with selected settings) for the image capture device 300. For example, user selection of one particular setting may cause one or more other settings of the image capture device to become available or become unavailable. The graphical user interface presented on the electronic display 308 and/or the electronic display of the mobile device may dynamically change to show the available settings of the image capture device 300.

Referring back to FIG. 1, the processor 11 (or one or more components of the processor 11) may be configured to obtain information to facilitate presenting dynamic settings of an image capture device. Obtaining information may include one or more of accessing, acquiring, analyzing, determining, examining, identifying, loading, locating, opening, receiving, retrieving, reviewing, selecting, storing, and/or otherwise obtaining the information. The processor 11 may obtain information from one or more locations. For example, the processor 11 may obtain information from a storage location, such as the electronic storage 13, electronic storage of information and/or signals generated by one or more sensors, electronic storage of a device accessible via a network, and/or other locations. The processor 11 may obtain information from one or more hardware components (e.g., an image sensor, an electronic display, a touchscreen display) and/or one or more software components (e.g., software running on a computing device).

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate presenting dynamic settings of an image capture device. The machine-readable instructions 100 may include one or more computer program components. The machine-readable instructions 100 may include one or more of a graphical user interface component 102, a user input component 104, a change component 106, and/or other computer program components.

The graphical user interface component 102 may be configured to present one or more graphical user interfaces on the electronic display 16 and/or other electronic display (s). Presenting a graphical user interface on an electronic display may include displaying, exhibiting, showing, and/or otherwise presenting the graphical user interface on an electronic display. Presenting a graphical user interface on an electronic display may include bringing about, effectuating, facilitating, and/or otherwise causing the graphical user interface to be presented on the electronic display.

A graphical user interface may refer to a user interface that enables a user to interact with the system 10 through one or more interface elements. A graphical user interface may refer to a user interface that enables the system 10 to provide information to a user through one or more interface elements. An interface element may refer to a graphical element of the graphical capture user interface, such as window, icon, button, graphic, and/or other visual indicator. A graphical user interface may be static or dynamic. A graphical user interface may include a static configuration of interface elements and/or include dynamic configurations of interface elements that changes (e.g., with time, based on user interaction with one or more interface elements, based on settings of the image capture device). Multiple/different interface elements may be presented/included within a graphical user interface at the same time, may be presented/included within a graphical user interface at different times, and/or may be presented/included within a graphical user interface responsive to user interaction with one or more other interface elements and/or other information.

A graphical user interface may include one or more interface elements. An interface element may visually provide information and/or enable a user to provide inputs to the system 10. For example, an interface element may visually provide information determined by the system 10 and/or a user may interact (e.g., engage, toggle, manipulate) with an interface element (virtual button) to provide one or more input to the system 10. A user may interact with an interface element to control the image capture device. For example, a user may interact with an interface element to change setting of the image capture device, cause the image capture device to start content capture, cause the image capture device to stop content capture, and/or otherwise control the image capture device. A user may interact with an interface element by interacting with (e.g., tapping, pressing, holding a finger on) the location of the electronic display 16 corresponding to the interface element.

The graphical user interface(s) may provide a view of settings of the image capture device. A setting of an image capture device may refer to a configuration of the image capture device. A setting of an image capture device may determine how the image capture device operates, such as in capturing content. A view of the settings of the image capture device may include presentation of settings of the image capture device that may be selected by the user to configure the image capture device. A view of the settings of the image capture device may include presentation of interface elements corresponding to the settings, which may enable the user to select one or more settings by interacting with the corresponding interface elements.

A view of the settings of the image capture device may include a dynamic arrangement of interface elements for the settings of the image capture device. The dynamic arrangement of interface elements may dynamically change to show available settings of the image capture device. Available settings of the image capture device may refer to settings of the image capture device that are able to be used with currently selected settings of the image capture device. Available settings of the image capture device may refer to settings that are compatible with currently selected settings of the image capture device. The dynamic arrangement of interface elements may change to show (e.g., add to the graphical user interface) or show differently (e.g., not greyed out) settings of the image capture device that becomes available. The dynamic arrangement of interface elements may change to not show (e.g., hide) or show differently (e.g., grey out) settings of the image capture device that becomes unavailable.

For example, the dynamic arrangement of interface elements may include an arrangement of interface elements for a set of settings of the image capture device and/or other arrangements of interface elements for other sets of settings of the image capture device. The dynamic arrangement of interface elements may include an arrangement of interface elements for a set of settings of the image capture device that is currently available. The dynamic arrangement of interface elements may include the same or different interface elements for different sets of settings of the image capture device. The dynamic arrangement of interface elements may change based on user selection of one or more settings.

The user input component 104 may be configured to receive user input to select one or more of the settings of the image capture device. Receiving user input to select a setting of the image capture device may include detecting, determining, discerning, discovering, finding, identifying, and/or otherwise receiving the user input to select the setting of the image capture device. A user may provide user input to select a setting of the image capture device by interacting with one or more interface elements on the electronic display 16 and/or other electronic display(s).

The user input to select one or more of the settings of the image capture device may be received based on user interaction with the electronic display 16 and/or other electronic display(s). The user input to select one or more of the settings of the image capture device may be received based on user interaction with one or more interface elements presented on the electronic display 16. For example, receiving user input to select a setting of the image capture device may include determining how the user interacted with the interface elements on the electronic display 16. Receiving user input to select a setting of the image capture device may include interpreting user interaction with the interface elements on the electronic display 16 into one or more commands to select (ascertain, determine, establish, set) the setting. For example, the user input component 104 may be configured to receive user input to select a given setting of the image capture device. The user input to select the given setting of the image capture device may be received based on user interaction with a corresponding setting element presented on the electronic display 16.

The selection of one or more settings of the image capture device by the user may change the available settings of the image capture device. The selection of the setting(s) may make a setting available or unavailable. The selection of the setting(s) may change the set of settings that are available. For example, selection of a particular aspect ratio for video capture may result in certain resolution, frame rate, lenses (field of view, distortion), or stabilization becoming available or unavailable. The settings of the image capture device may include multiple types of settings. User selection of a particular type of setting may make other types of settings become available or unavailable. For example, different types of settings for the image capture device may include visual profile setting type (standard video, HDR video), aspect ratio setting type, resolution setting type, frame rate setting type, lens setting type, stabilization setting type, and/or other types of settings. User selection of particular visual profile setting or particular aspect ratio setting may determine which of the resolution settings, frame rate settings, lens settings, and/or stabilization settings are available/unavailable. Other changes in the available settings of the image capture device are contemplated.

The change component 106 may be configured to change the dynamic arrangement of interface elements. The change component 106 may be configured to change the dynamic arrangement of interface elements within the graphical user interface(s). The change component 106 may be configured to change the dynamic arrangement of interface elements presented on the electronic display 16 and/or other electronic display. The dynamic arrangement of interface elements may be changed based user input that changes the available settings of the image capture device and/or other information. The dynamic arrangement of interface elements may be changed based on one or more changes in the available settings of the image capture device. The dynamic arrangement of interface elements may be changed to show (e.g., add to the graphical user interface) or show differently (e.g., not greyed out) settings of the image capture device that becomes available. The dynamic arrangement of interface elements may change to not show (e.g., hide) or show differently (e.g., grey out) settings of the image capture device that becomes unavailable.

For example, the change component 106 may be configured to, responsive to the user input to select a setting of the image capture device that changes the available settings of the image capture device, change the dynamic arrangement of interface elements from including one arrangement of interface elements for one set of settings of the image capture device to including a different arrangement of interface elements for a different set of settings of the image capture device. The two arrangements of interface element being different may include the arrangements including different interface elements, showing the same interface element(s) differently, and/or positioning the interface elements differently.

For example, the dynamic arrangement of interface elements may include a setting element for a setting of the image capture device. The change in the available settings for the image capture device may include the setting of the image capture device becoming unavailable, such as being incompatible with other selected setting(s) of the image capture device. The dynamic arrangement of interface elements may change to not include the setting element responsive to the setting of the image capture device becoming unavailable. The dynamic arrangement of interface elements may change to change one or more visual characteristics of the setting element responsive to the setting of the image capture device becoming unavailable. The changed visual characteristic(s) of the setting element may indicate that the setting of the image capture device is unavailable. For example, the setting element may be greyed out to indicate that the setting of the image capture device is unavailable.

As another example, the change in the available settings for the image capture device may include the setting of the image capture device becoming available, such as being compatible with other selected setting(s) of the image capture device. The dynamic arrangement of interface elements may originally not include the setting element for the setting of the image capture device, and the dynamic arrangement of interface elements may change to include the setting element responsive to the setting of the image capture device becoming available. The dynamic arrangement of interface elements may originally include the setting element for the setting of the image capture device, with one or more visual characteristics of the setting element indicating that the setting of the image capture device is unavailable, and the dynamic arrangement of interface elements may change to change one or more visual characteristics of the setting element responsive to the setting of the image capture device becoming available. The changed visual characteristic(s) of the setting element may indicate that the setting of the image capture device is available.

In some implementations, a given setting of the image capture device that causes interface elements for other settings of the image capture device to appear or disappear from the dynamic arrangement of interface elements may include visual profile setting, aspect ratio setting, and/or other settings. If a setting of the image capture device is compatible with the selected visual profile setting or the selected aspect ratio setting, then the corresponding setting element may be presented within the dynamic arrangement of interface elements (e.g., kept in the dynamic arrangement of interface elements based on the setting staying available, added to the dynamic arrangement of interface elements based on the setting changing to become available). If a setting of the image capture device is not compatible with the selected visual profile setting or the selected aspect ratio setting, then the corresponding setting element may not be presented within the dynamic arrangement of interface elements (e.g., kept hidden from the dynamic arrangement of interface elements based on the setting staying unavailable, removed from the dynamic arrangement of interface elements based on the setting changing to become unavailable).

In some implementations, addition or removal of an interface element to the dynamic arrangement of interface elements may change the appearance of existing interface elements within the dynamic arrangement of interface elements. For example, the sizes of the interface elements may change to fit the available space within the graphical user interface. Based on disappearance of an existing interface element, one or more remaining interface elements (e.g., interface elements near the hidden interface element, interface elements in the same row/column as the hidden interface element) may become larger/longer to take up the space left by the hidden interface element. Based on appearance of a new interface element, one or more remaining interface elements (e.g., interface elements near the new interface element, interface elements in the same row/column as the new interface element) may become smaller/shorter to squeeze the interface elements into the same space.

In some implementations, a given setting of the image capture device that causes interface elements for other settings of the image capture device to change in one or more visual characteristics includes a resolution setting, a frame rate setting, a lens setting, a stabilization setting, and/or other settings. If a setting of the image capture device is compatible with the selected resolution setting, the selected frame rate setting, the selected lens settings, or the selected stabilization setting, then the corresponding setting element may be presented within the dynamic arrangement of interface elements using one or more particular visual characteristics (e.g., not greyed out). If a setting of the image capture device is no compatible with the selected resolution setting, the selected frame rate setting, the selected lens settings, or the selected stabilization setting, then the corresponding setting element may be presented within the dynamic arrangement of interface elements using different visual characteristic(s) (e.g., greyed out). Other changes in the dynamic arrangement of interface elements are contemplated.

In some implementations, a setting element corresponding to an unavailable setting may not be selectable by the user. The user may not be able to select the unavailable setting by interacting with the corresponding setting element. In some implementations, a setting element corresponding to an unavailable setting may be selectable by the user. The user may be able to select the unavailable setting by interacting with the corresponding setting element. The user selection of the unavailable setting may cause other setting(s) of the image capture device to automatically change. Other setting(s) of the image capture device to automatically change into a configuration in which the selected unavailable setting is available.

FIGS. 4A, 4B, 4C, 4D, 5A, 5B, 5C, and 5D illustrate example graphical user interfaces 400, 500. The views of the graphical user interfaces 400, 500 in FIGS. 4A, 4B, 4C, 4D, 5A, 5B, 5C, and 5D are provided merely as examples, and the arrangement and visual aspects of the graphical user interface may vary depending on the implementation. In some implementations, the graphical user interface may include additional features and/or alternative features. In some implementations, the graphical user interface may not include features shown in FIGS. 4A, 4B, 4C, 4D, 5A, 5B, 5C, and 5D. Other graphical user interfaces are contemplated.

Figure 4A:
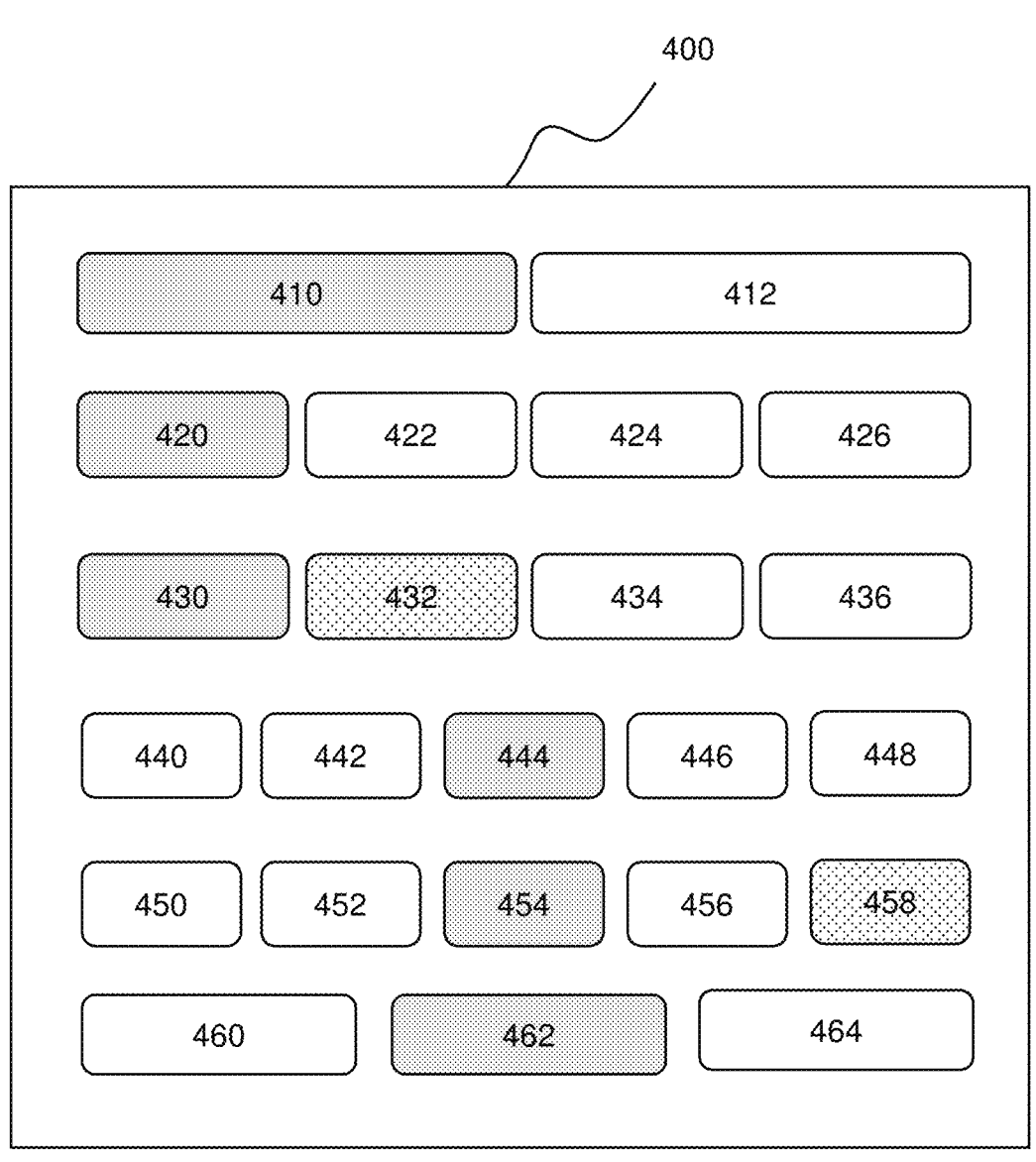
FIG. 4A illustrates an example graphical user interface.

Referring to FIG. 4A, the graphical user interface 400 may provide a view of settings of an image capture device. The graphical user interface 400 may include interface elements (e.g., setting elements) 410, 412, 420, 422, 424, 426, 430, 432, 423, 436, 440, 442, 444, 446, 448, 450, 452, 454, 456, 458, 460, 462, 464 corresponding to different settings of the image capture device. Different interface elements for different types of settings of the image capture device may be grouped together. For example, individual rows of interface elements may correspond to individual types of image capture device settings (e.g., one row of virtual buttons for different visual profiles, another row of virtual buttons for different aspect ratios). One or more visual characteristics of the interface elements may indicate whether the corresponding settings of the image capture device are available, unavailable, and/or selected. For example, the interface elements corresponding to selected settings (e.g., the interface elements 410, 420, 430, 444, 454, 462) may have a certain color to indicate that the corresponding settings have been selected, the interface elements corresponding to unselected settings (e.g., the interface elements 412, 422, 424, 426, 434, 436, 440, 442, 446, 448, 450, 452, 456, 460, 464) may have a different color to indicate that the corresponding settings have not been selected, and the interface elements corresponding to unavailable settings (e.g., the interface elements 432, 458) may be greyed out to indicate that the corresponding settings are unavailable.

Figure 4B:
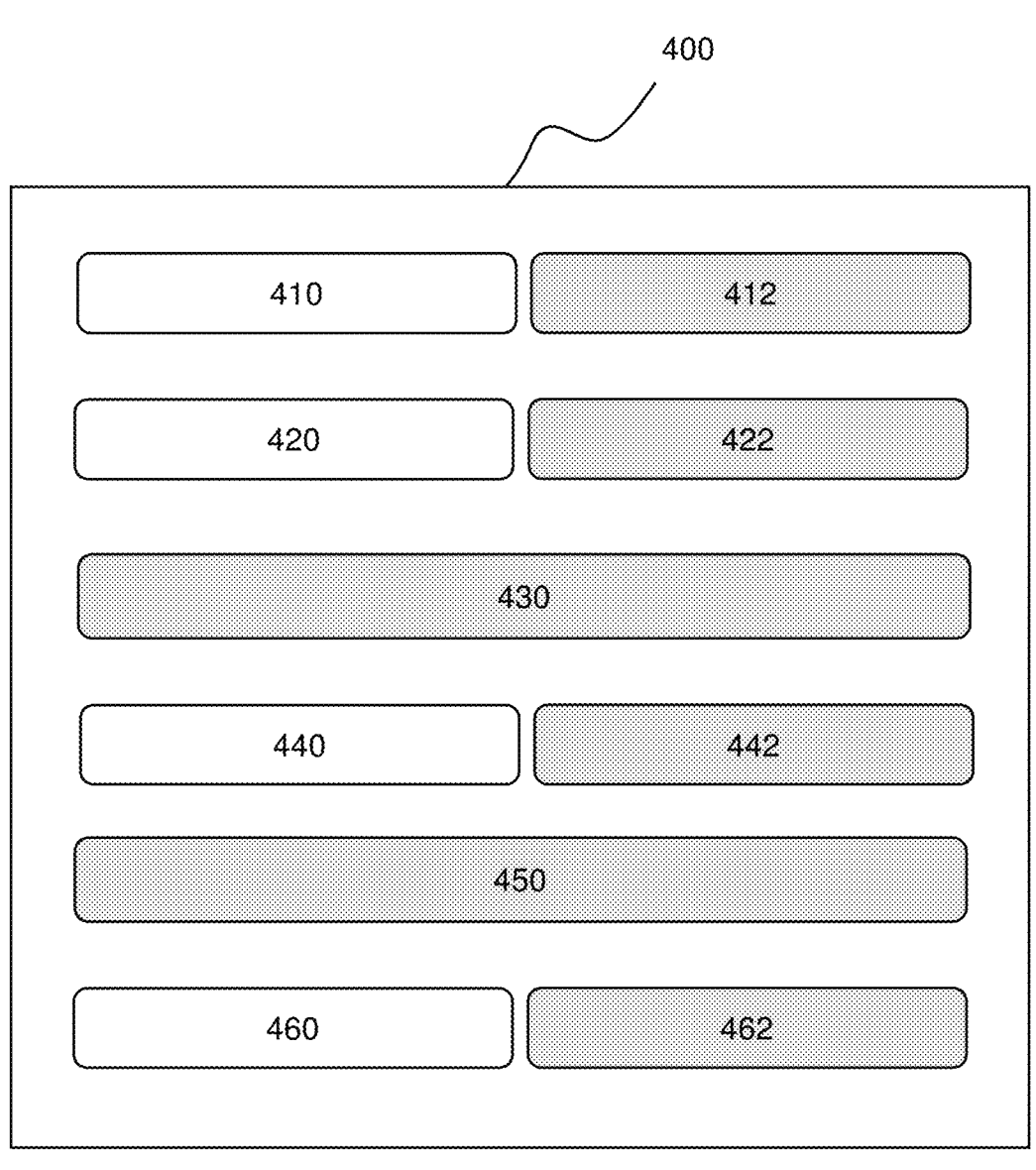
FIG. 4B illustrates an example graphical user interface.

The interface elements within the graphical user interface 400 may dynamically change to show the available settings of the image capture device. For example, referring to FIG. 4B, a user may have changed the settings of the image capture device by selecting the interface element 412. User selection of the setting corresponding to the interface element 412 may change the available settings of the image capture device. The graphical user interface 400 may change as shown in FIG. 4B, with the interface elements 424, 426, 432, 434, 436, 444, 446, 448, 452, 454, 456, 458, 464 disappearing from the graphical user interface 400. The interface elements that have disappeared from the graphical user interface 400 may correspond to the settings of the image capture device that have become unavailable due to selection of the setting corresponding to the interface element 412.

Figure 4C:
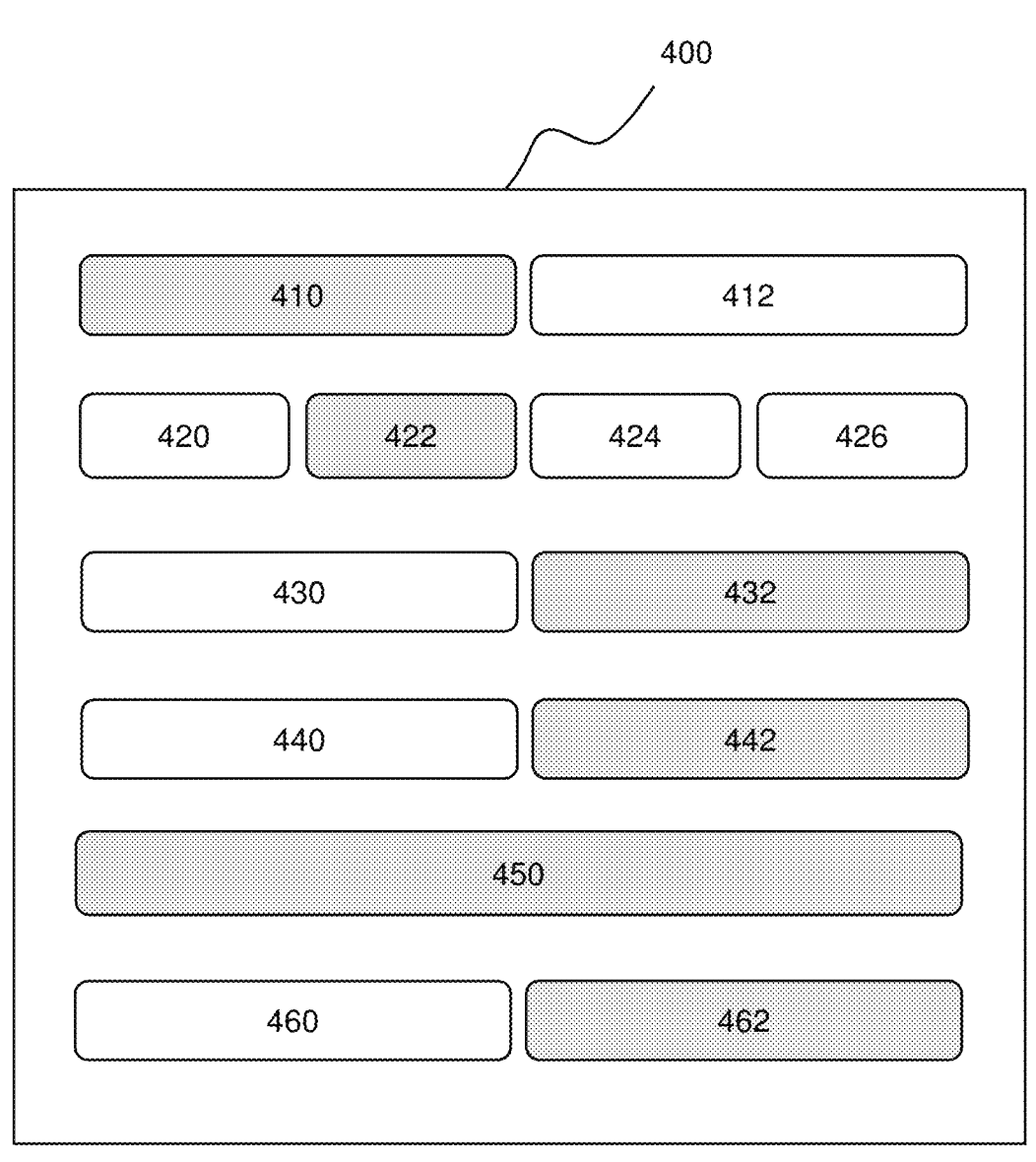
FIG. 4C illustrates an example graphical user interface.

As another example, referring to FIG. 4C, a user may have changed the settings of the image capture device by selecting the interface element 422. User selection of the setting corresponding to the interface element 422 may change the available settings of the image capture device. The graphical user interface 400 may change (from FIG. 4A) as shown in FIG. 4C, with the interface elements 434, 436, 444, 446, 448, 452, 454, 456, 458, 464 disappearing from the graphical user interface 400. The interface elements that have disappeared from the graphical user interface 400 may correspond to the settings of the image capture device that have become unavailable due to selection of the setting corresponding to the interface element 422.

Figure 4D:
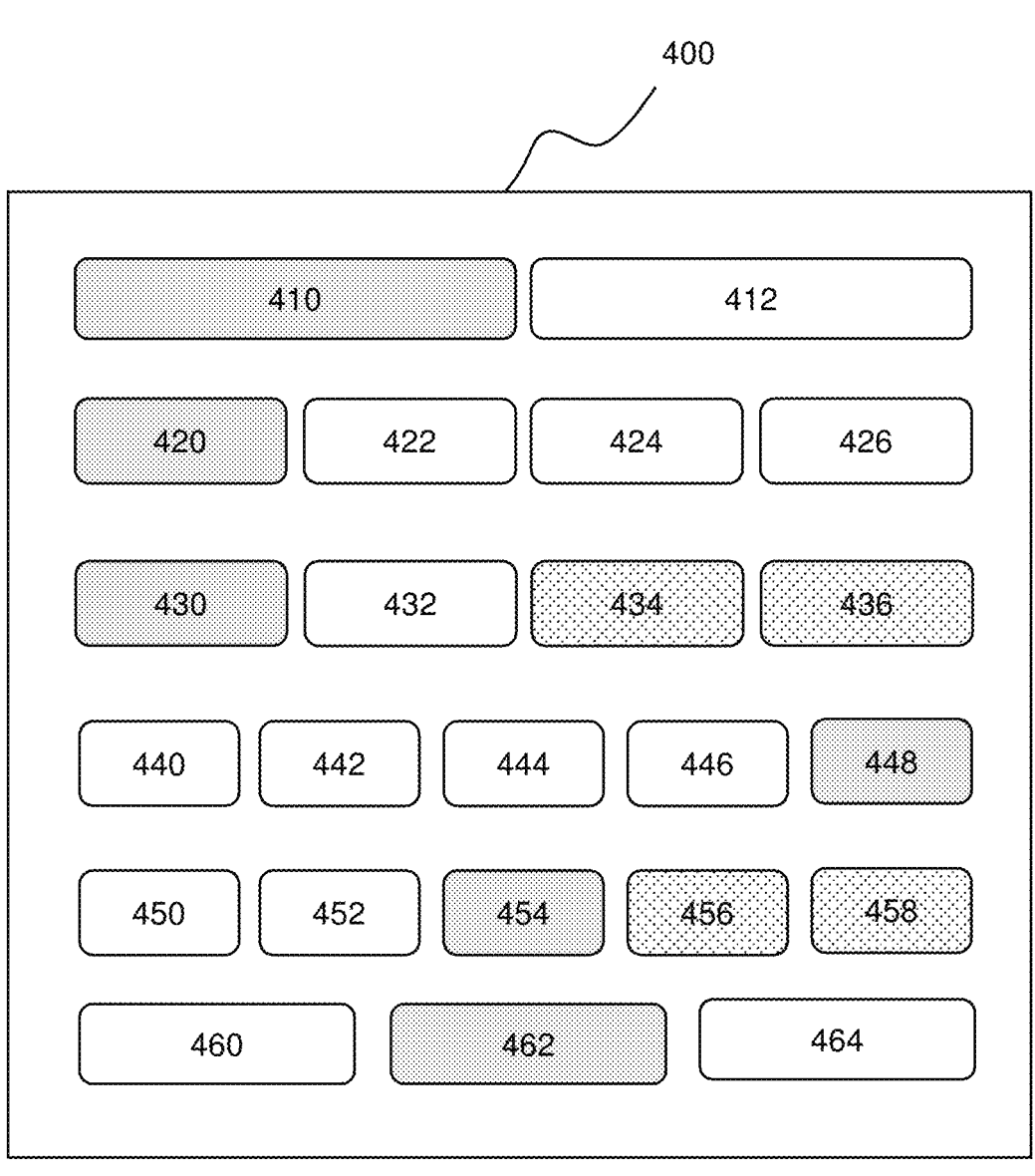
FIG. 4D illustrates an example graphical user interface.

As another example, referring to FIG. 4D, a user may have changed the settings of the image capture device by selecting the interface element 448. User selection of the setting corresponding to the interface element 448 may change the available settings of the image capture device. The graphical user interface 400 may change (from FIG. 4A) as shown in FIG. 4D, with the visual characteristic(s) of the interface elements 434, 436, 456 changing to indicate that the corresponding settings of the image capture device have become unavailable due to selection of the setting corresponding to the interface element 448 and the visual characteristic(s) of the interface element 433 changing to indicate that the corresponding setting of the image capture device has become available due to selection of the setting corresponding to the interface element 448. Other dynamic changes in the arrangement of interface elements are contemplated.

Figure 5A:
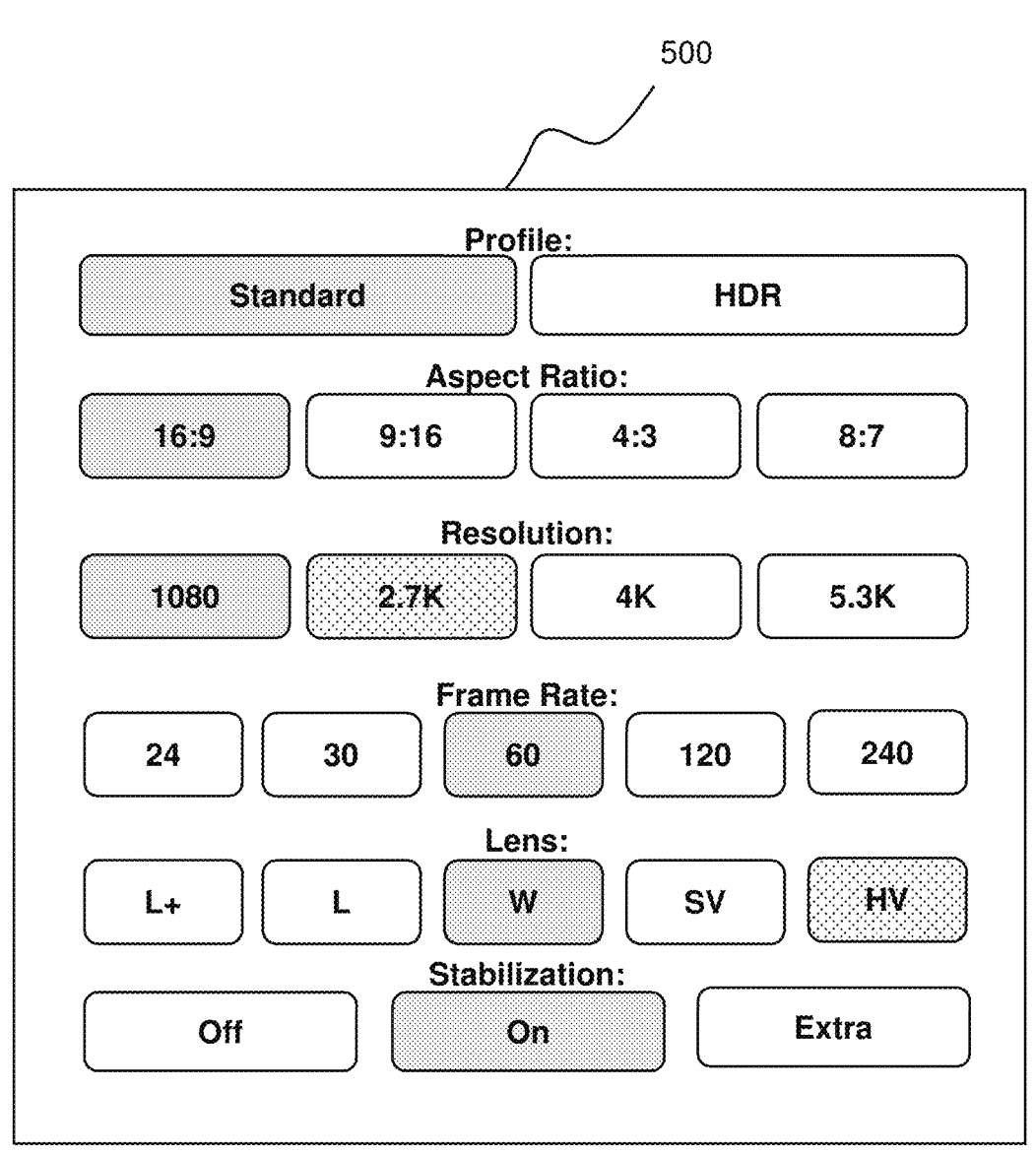
FIG. 5A illustrates an example graphical user interface.

Referring to FIG. 5A, the graphical user interface 500 may provide a view of settings of an image capture device. The graphical user interface 500 may include interface elements (e.g., setting elements) corresponding to different settings of the image capture device. Different interface elements for different types of settings of the image capture device may be grouped together. For example, the first row of interface elements may enable selection of different profile settings (standard video vs HDR video), the second row of interface elements may enable selection of different aspect ratios, the third row of interface elements may enable selection of different resolutions, the fourth row of interface elements may enable selection of different frame rates, the fourth row of interface elements may enable selection of different lenses (field of view and distortion to simulate capture through different lenses), and the fifth row of interface elements may enable selection of different stabilization to be applied.

One or more visual characteristics of the interface elements may indicate whether the corresponding settings of the image capture device are available, unavailable, and/or selected. For example, the interface elements for the selected settings (e.g., Standard profile, 10:9 aspect ratio, 1080 resolution, 60 frame rate, W lens, On stabilization) may have a certain color to indicate that the corresponding settings have been selected, the interface elements for unavailable settings (e.g., 2.7K resolution, HyperView lens) may be greyed out to indicate that the corresponding settings are unavailable, and other interface elements may have a different color to indicate that the corresponding settings have not been selected.

Figure 5B:
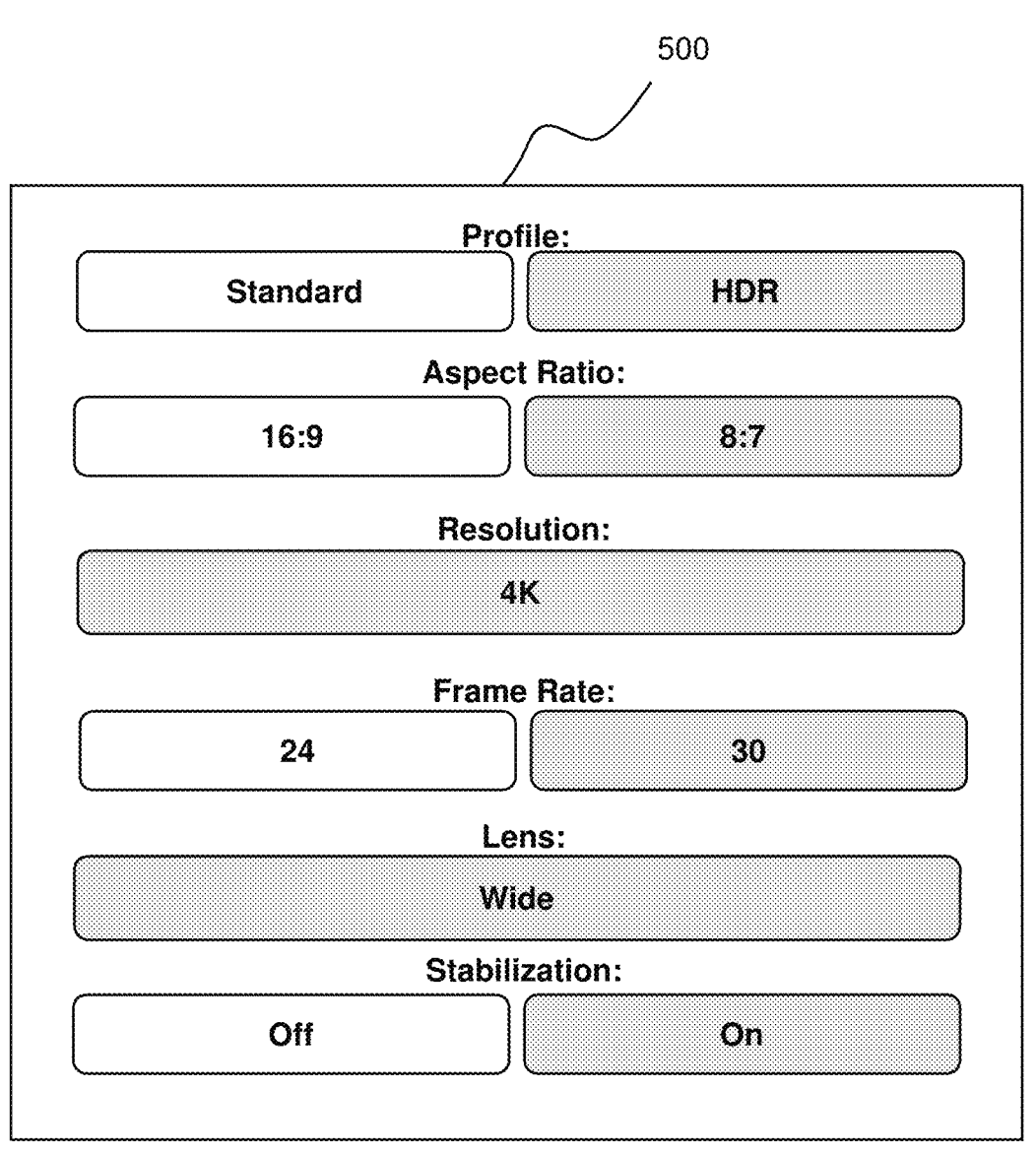
FIG. 5B illustrates an example graphical user interface.

The interface elements within the graphical user interface 500 may dynamically change to show the available settings of the image capture device. For example, referring to FIG. 5B, a user may have changed the settings of the image capture device by selecting the interface element corresponding to the HDR video setting. User selection of the HDR video setting may change the available settings of the image capture device. The graphical user interface 500 may change as shown in FIG. 5B, with a number of interface elements for aspect ratios, resolution, frame rate, lens, and stabilization disappearing from the graphical user interface 500. The interface elements that have disappeared from the graphical user interface 500 may correspond to the settings of the image capture device that have become unavailable due to selection of the HDR video setting.

Figure 5C:
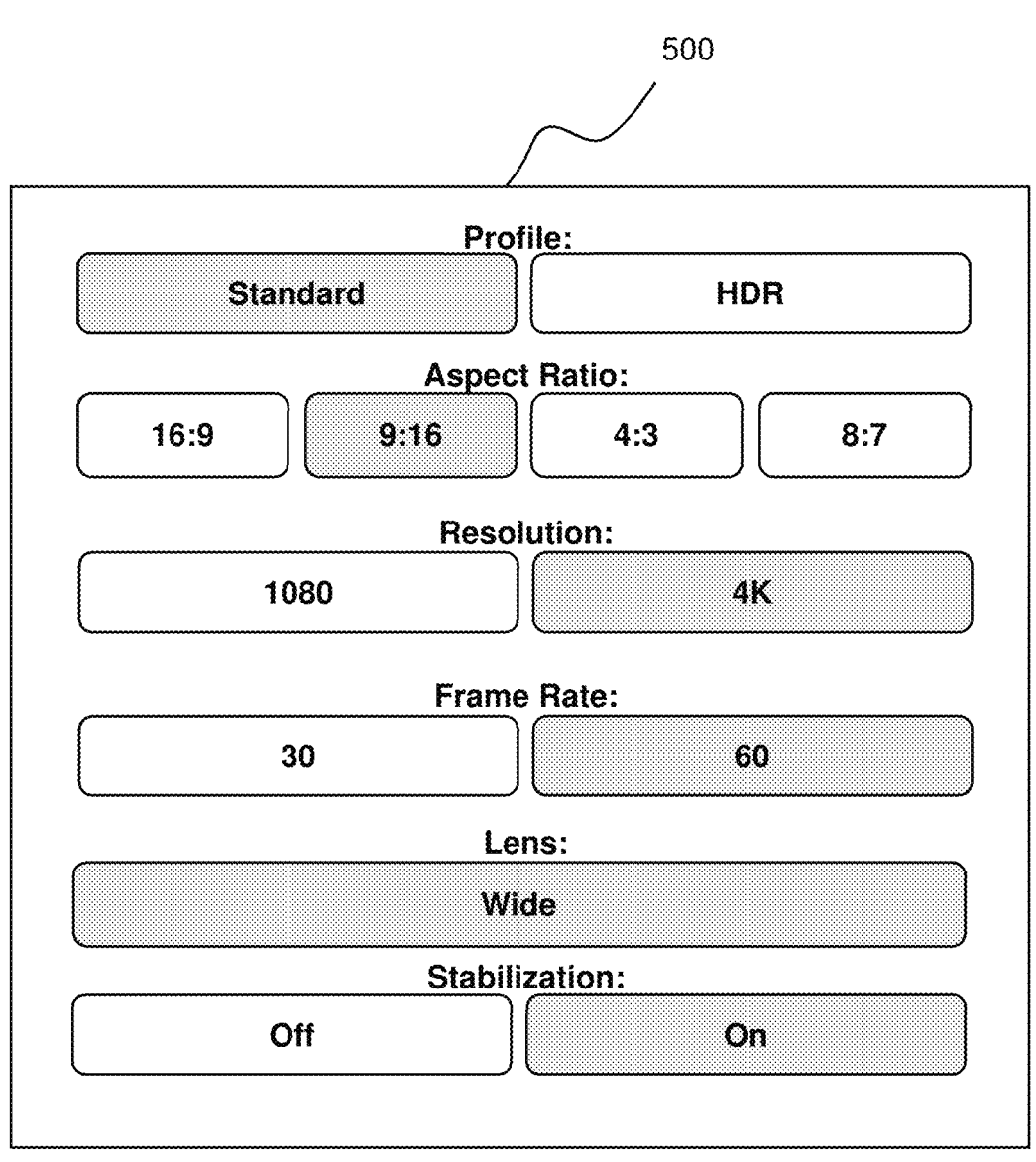
FIG. 5C illustrates an example graphical user interface.

As another example, referring to FIG. 5C, a user may have changed the settings of the image capture device by selecting the interface element corresponding to the 9:16 aspect ratio setting. User selection of the 9:16 aspect ratio setting may change the available settings of the image capture device. The graphical user interface 500 may change (from FIG. 5A) as shown in FIG. 5C, with a number of interface elements for resolution, frame rate, lens, and stabilization disappearing from the graphical user interface 500. The interface elements that have disappeared from the graphical user interface 500 may correspond to the settings of the image capture device that have become unavailable due to selection of the 9:16 aspect ratio setting.

Figure 5D:
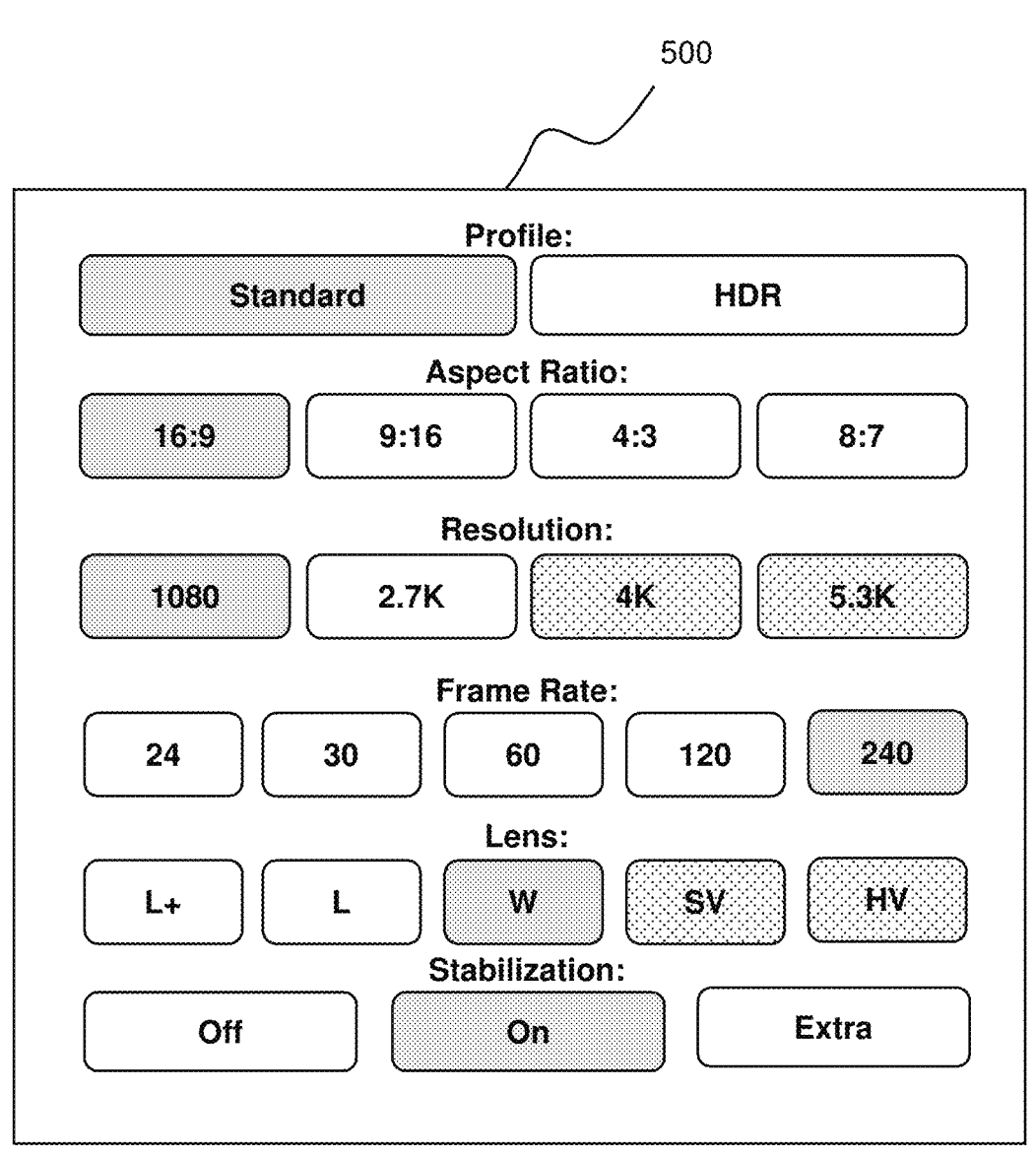
FIG. 5D illustrates an example graphical user interface.

As another example, referring to FIG. 5D, a user may have changed the settings of the image capture device by selecting the interface element corresponding to the 240 frame rate setting (240 frames per second). User selection of the 240 frame rate setting may change the available settings of the image capture device. The graphical user interface 500 may change (from FIG. 5A) as shown in FIG. 5D, with the visual characteristic(s) of the interface elements corresponding to the 4K resolution setting, the 5.3K resolution setting, and the SuperView lens setting changing to indicate that the these settings of the image capture device have become unavailable due to selection of the 240 frame rate setting and the visual characteristic(s) of the interface element corresponding to the 2.7K resolution setting changing to indicate that this setting of the image capture device has become available due to selection of the 240 frame rate setting. Other dynamic changes in the arrangement of interface elements are contemplated.

The user may be able to select a setting element corresponding to an unavailable setting. User selection of an unavailable setting may cause other setting(s) of the image capture device to automatically change so that the selected setting is available. Automatic changes may be made to those settings that causes visual characteristics of an interface element for an unavailable setting to have a different visual characteristic than an interface element for an available setting. For example, automatic changes may be made to resolution setting, frame rate setting, lens setting, and/or stabilization setting of the image capture device to make the selected setting available. Automatic changes may not be made to those settings that causes an interface element for an unavailable setting to disappear. For example, automatic changes may not be made to visual profile setting and/or aspect ratio setting to make the selected setting available. The visual profile setting and/or the aspect ratio setting may be locked from being automatically changed.

For example, referring to FIG. 5A, 2.7K resolution may not be compatible with frame rate of 60. User selection of 2.7K resolution may cause the frame rate to automatically change to a value compatible with 2.7K resolution (e.g., frame rate of 240).

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible (non-transitory) machine-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

While the implementations of the disclosure are described with respect to the system 10, this is merely as an example and is not meant to be limiting. In some implementation, some or all of the functionalities attributed herein to the system 10 may be performed by another system, one or more computing devices, and/or one or more processing apparatuses (e.g., tangible hardware/equipment that processes information). In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11, the electronic storage 13, the image sensor 15, and the electronic display 16 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented.

The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

FIG. 2 illustrates method 200 for presenting dynamic settings of an image capture device. The operations of method 200 presented below are intended to be illustrative. In some implementations, method 200 may be accomplished with one or more additional operations not described, and/or without one or more of the operations discussed. In some implementations, two or more of the operations may occur simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, an image capture device may include a housing. The housing may carry one or more of an optical element, an image sensor, an electronic display, and/or other components. The optical element may guide light within a field of view to the image sensor. The image sensor may generate a visual output signal conveying visual information based on light that becomes incident thereon. The visual information may define visual content. The electronic display may visually present information At operation 201, a graphical user interface may be presented on the electronic display. The graphical user interface may provide a view of settings of the image capture device. The view of the settings of the image capture device may include a dynamic arrangement of interface elements for the settings of the image capture device. The dynamic arrangement of interface elements may dynamically change to show available settings of the image capture device. The dynamic arrangement of interface elements may include a first arrangement of interface elements for a first set of settings of the image capture device. The first arrangement of interface elements may include a first setting element for a first setting of the image capture device. In some implementations, operation 201 may be performed by a processor component the same as or similar to the graphical user interface component 102 (Shown in FIG. 1 and described herein).

At operation 202, user input to select the first setting of the image capture device may be received based on user interaction with the first setting element and/or other information. The selection of the first setting of the image capture device may change the available settings of the image capture device. In some implementations, operation 202 may be performed by a processor component the same as or similar to the user input component 104 (Shown in FIG. 1 and described herein).

At operation 203, responsive to the user input to select the first setting of the image capture device that changes the available settings of the image capture device, the dynamic arrangement of interface elements may be changed from including the first arrangement of interface elements for the first set of settings of the image capture device to including a second arrangement of interface elements for a second set of settings of the image capture device. The second arrangement of interface elements may be different from the first arrangement of interface elements. In some implementations, operation 203 may be performed by a processor component the same as or similar to the change component 106 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. An image capture device for presenting dynamic settings, the image capture device comprising:
   a housing;
   an optical element carried by the housing and configured to guide light within a field of view to an image sensor;
   the image sensor carried by the housing and configured to generate a visual output signal conveying visual information based on light that becomes incident thereon, the visual information defining visual content;
   an electronic display carried by the housing and configured to visually present information; and
   one or more physical processors carried by the housing and configured by machine-readable instructions to:
      present a graphical user interface on the electronic display, the graphical user interface providing a view of settings of the image capture device, the view of the settings of the image capture device including a dynamic arrangement of interface elements for the settings of the image capture device, the dynamic arrangement of interface elements dynamically changing to show available settings of the image capture device, wherein the dynamic arrangement of interface elements includes a first arrangement of interface elements for a first set of settings of the image capture device, the first arrangement of interface elements including a first setting element for a first setting of the image capture device;

receive user input to select the first setting of the image capture device based on user interaction with the first setting element, wherein the selection of the first setting of the image capture device changes the available settings of the image capture device; and responsive to the user input to select the first setting of the image capture device that changes the available settings of the image capture device, change the dynamic arrangement of interface elements from including the first arrangement of interface elements for the first set of settings of the image capture device to including a second arrangement of interface elements for a second set of settings of the image capture device, the second arrangement of interface elements different from the first arrangement of interface elements;

wherein:

visual profile setting or aspect ratio setting of the image capture device causes interface elements for other settings of the image capture device to appear or disappear from the dynamic arrangement of interface elements; and resolution setting, frame rate setting, lens setting, or stabilization setting of the image capture device causes change in a visual characteristic of interface elements for other settings of the image capture device, and wherein:

the first arrangement of interface elements further includes a second setting element for a second setting of the image capture device;

the change in the available settings for the image capture device includes the second setting of the image capture device becoming unavailable;

responsive to the second setting of the image capture device becoming unavailable based on the user input to select the visual profile setting or the aspect ratio setting of the image capture device, the second setting element is not included in the second arrangement of interface element; and responsive to the second setting of the image capture device becoming unavailable based on the user input to select the resolution setting, the frame rate setting, the lens setting, or the stabilization setting of the image capture device, a visual characteristic of the second setting element is changed in the second arrangement of interface element.

2. The image capture device of claim 1, wherein the change in the available settings for the image capture device includes a third setting of the image capture device becoming available.

3. The image capture device of claim 2, wherein:

the first arrangement of interface elements does not include a third setting element for the third setting of the image capture device; and the second arrangement of interface elements includes the third setting element responsive to the third setting of the image capture device becoming available.

4. The image capture device of claim 2, wherein:

the first arrangement of interface elements includes a third setting element for the third setting of the image capture device, a visual characteristic of the third setting element indicating that the third setting of the image capture device is unavailable; and the second arrangement of interface elements includes a change in a visual characteristic of the third setting element responsive to the third setting of the image capture device becoming available, the changed visual characteristic of the second setting element indicating that the third setting of the image capture device is available.

5. The image capture device of claim 1, wherein a given setting of the image capture device that causes interface elements for other settings of the image capture device to appear or disappear from the dynamic arrangement of interface elements includes visual profile setting or aspect ratio setting.

6. The image capture device of claim 1, wherein a given setting of the image capture device that causes interface elements for other settings of the image capture device to change in a visual characteristic includes resolution setting, frame rate setting, lens setting, or stabilization setting.

7. A method for presenting dynamic settings, the method performed by an image capture device, the image capture device including one or more processors, an image sensor, an optical element, and an electronic display, the image sensor configured to generate a visual output signal conveying visual information based on light that becomes incident thereon, the visual information defining visual content, the optical element configured to guide light within a field of view to the image sensor, the electronic display configured to visually present information, the method comprising:

presenting a graphical user interface on the electronic display, the graphical user interface providing a view of settings of the image capture device, the view of the settings of the image capture device including a dynamic arrangement of interface elements for the settings of the image capture device, the dynamic arrangement of interface elements dynamically changing to show available settings of the image capture device, wherein the dynamic arrangement of interface elements includes a first arrangement of interface elements for a first set of settings of the image capture device, the first arrangement of interface elements including a first setting element for a first setting of the image capture device;

receiving user input to select the first setting of the image capture device based on user interaction with the first setting element, wherein the selection of the first setting of the image capture device changes the available settings of the image capture device; and responsive to the user input to select the first setting of the image capture device that changes the available settings of the image capture device, changing the dynamic arrangement of interface elements from including the first arrangement of interface elements for the first set of settings of the image capture device to including a second arrangement of interface elements for a second set of settings of the image capture device, the second arrangement of interface elements different from the first arrangement of interface elements, wherein:

visual profile setting or aspect ratio setting of the image capture device causes interface elements for other settings of the image capture device to appear or disappear from the dynamic arrangement of interface elements; and resolution setting, frame rate setting, lens setting, or stabilization setting of the image capture device causes change in a visual characteristic of interface elements for other settings of the image capture device, and wherein:

the first arrangement of interface elements further includes a second setting element for a second setting of the image capture device;

the change in the available settings for the image capture device includes the second setting of the image capture device becoming unavailable;

responsive to the second setting of the image capture device becoming unavailable based on the user input to select the visual profile setting or the aspect ratio setting of the image capture device, the second setting element is not included in the second arrangement of interface element; and responsive to the second setting of the image capture device becoming unavailable based on the user input to select the resolution setting, the frame rate setting, the lens setting, or the stabilization setting of the image capture device, a visual characteristic of the second setting element is changed in the second arrangement of interface element.

8. The method of claim 7, wherein the change in the available settings for the image capture device includes a third setting of the image capture device becoming available.

9. The method of claim 8, wherein:

the first arrangement of interface elements does not include a third setting element for the third setting of the image capture device; and the second arrangement of interface elements includes the third setting element responsive to the third setting of the image capture device becoming available.

10. The method of claim 8, wherein:

the first arrangement of interface elements includes a third setting element for the third setting of the image capture device, a visual characteristic of the third setting element indicating that the third setting of the image capture device is unavailable; and the second arrangement of interface elements includes a change in a visual characteristic of the third setting element responsive to the third setting of the image capture device becoming available, the changed visual characteristic of the third setting element indicating that the second setting of the image capture device is available.

11. The method of claim 7, wherein a given setting of the image capture device that causes interface elements for other settings of the image capture device to appear or disappear from the dynamic arrangement of interface elements includes visual profile setting or aspect ratio setting.

12. The method of claim 7, wherein a given setting of the image capture device that causes interface elements for other settings of the image capture device to change in a visual characteristic includes resolution setting, frame rate setting, lens setting, or stabilization setting.

* * * * *